Oct. 28, 1941.  A. L. STELLHORN  2,261,080

HIGH PRESSURE FLUID MEDIUM DISTRIBUTION SYSTEM

Filed March 13, 1939

INVENTOR
August L. Stellhorn
BY
J. William Carson
ATTORNEY

Patented Oct. 28, 1941

2,261,080

UNITED STATES PATENT OFFICE 2,261,080

HIGH PRESSURE FLUID MEDIUM DISTRIBUTION SYSTEM

August L. Stellhorn, Packanack Lake, N. J., assignor to Specialties Development Corporation, Bloomfield, N. J., a corporation of New Jersey Application March 13, 1939, Serial No. 261,504

7 Claims. (Cl. 169—11)

This invention relates to apparatus for the distribution of fluid medium under pressure.

More specifically, the present invention has reference to improvements in distribution conduits for carbon dioxide released through said conduits from storage in liquid form under high pressure for the purpose of extinguishing fires.

Fire extinguishing systems of this type are generally installed to cover extensive localities with the result that the source of carbon dioxide is quite distant from its respective points of application, which usually comprise comparatively small directional nozzles. The conduits are used, of course, only in case of an emergency, meaning intermittently rather than continuously, and as a rule, relatively long and undesirable delays are experienced by the carbon dioxide in reaching the points of emission, since air trapped in the conduits will provide considerable resistance to the advance of the high pressure gaseous carbonic acid, and will have to escape before the extinguishing medium is able to get out.

Accordingly, it is an object of the present invention to provide a device in combination with a high pressure gaseous fluid medium distributing system of the type described, which will insure the elimination of any air present in the piping at a rapid rate upon the release of such high pressure fluid medium into the piping.

It is, of course, necessary that the pressure fluid medium should not be dissipated with the escaping air, and the arrangement must therefore cease to function as the gas reaches said device.

It is, therefore, another object of the invention to provide an arrangement in accordance with the first named object which will prevent the loss of any high pressure fluid medium expansibly released through the piping.

The operability of the device of the present invention has to depend upon the properties characteristic of carbonic acid as distinguished from those of air. The property of carbon dioxide most readily available and sufficiently distinct from the characteristics natural to air is based on the fact that $CO_2$, when rapidly expanding from confinement under pressure, experiences a very drastic cooling, the temperature dropping to as low a point as 100° F. below zero, approximately.

The specific embodiment of the present invention, therefore, is based upon this phenomenon; and it is accordingly a further object of the invention to provide a device of the type referred to which will make use of the thermal characteristics of quickly expanding carbon dioxide to achieve the proposed objects.

Other objects, not specifically enumerated above, will become apparent as the invention is described in greater detail in connection with the accompanying drawing, wherein.

Figure 3:
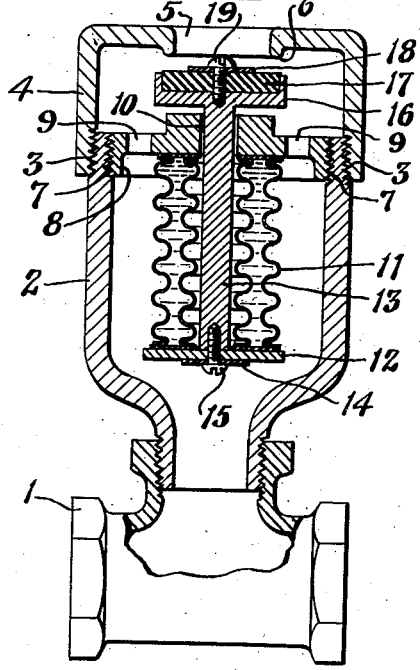
Figure 3 is a view in vertical central section of a conduit fitting including a device which lends itself to incorporation into a distribution system in accordance with the present invention.

Referring to Figure 3, there is shown in section a T-formed pipe fitting 1 adapted for connection into a conduit, to which is threadedly secured a valve housing 2. This valve housing is in threaded cooperation at 3, with outlet member 4 which is formed with an outlet 5 and a valve seat 6. The valve housing is also threaded interiorly at 7 to cooperate with corresponding threads on supporting member 8 formed with a plurality of ports 9 and a central passage 10. Mounted on the under side of supporting member 8 is the quick-acting thermostatic element 11 in the form of an annular, hollow, expansible and contractible metal bellows. The metal bellows contains a thermostatic fluid medium for causing said bellows to expand or contract in accordance with the ambient temperature, and through the medium of its base plate 12, is capable of transmitting such temperature responsive movements to valve stem 13 secured to the base plate by means of washer 14 and screw 15. Stem 13 extends up through passage 10 which acts as a guide therefor, and is formed at its top with a valve head 16 suitably recessed to provide space for valve disc 17. Valve disc 17 is held in place by washer 18 and screw 19.

Figure 1:
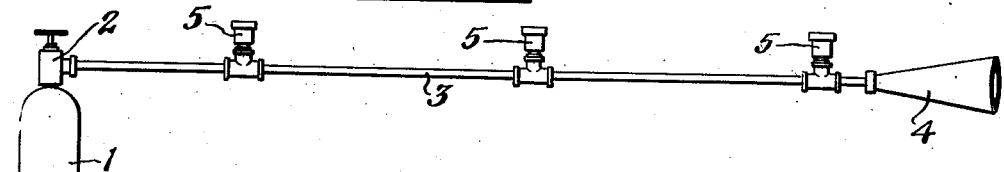
Figure 1 is a diagrammatical representation of a system for distributing $CO_2$ confined under pressure, and arranged in accordance with the present invention.

In the system of Figure 1, a supply of carbon dioxide under compression is indicated at 1, a release control therefor at 2, a distribution conduit at 3, a shielded directional fluid medium outlet at 4, and at 5 air relief devices in accordance with Figure 3, connected at intervals into the distribution piping in desired numbers.

Figure 2:
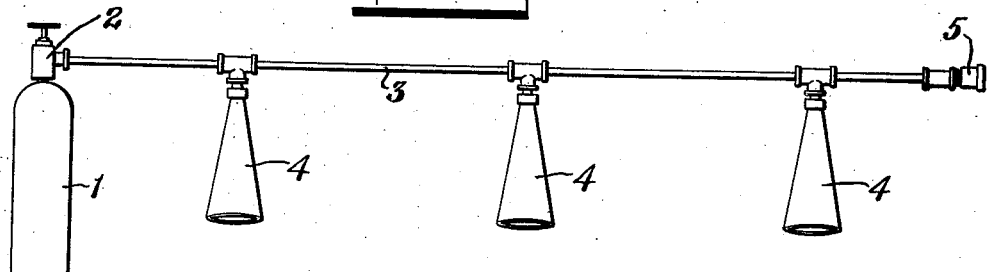
Figure 2 is a schematic view of a variation of the system of Figure 1 showing the principle of the invention applied somewhat differently.

Figure 2 shows a system composed of elements similar to those of Figure 1, but arranged along somewhat different lines. In this case, a plurality of outlet nozzles are spaced along the conduit, while the air elimination device is placed at the end thereof.

Ordinarily, valve 17 is not seated, so that when $CO_2$ is released into the distribution system, any air in the piping is pushed ahead of the fluid medium, and out through outlet nozzles 4 and any other openings in the conduit such as air relief device 5.

Referring now to Figure 3, it is seen that air is able to escape through outlet 5 via the ports 9, this egress, however, being cut off as soon as $CO_2$ starts to pass through, its extremely low temperature causing thermostatic element 11 to contract upwardly, carrying stem 13 with it, thus seating valve 17 onto seat 6.

In the system of Figure 1, $CO_2$, upon its release, is conducted toward shielded outlet 4, driving out as it advances any air through air relief devices 5, which close consecutively as the cold gas reaches them, so that by the time outlet 4 is reached, substantially all air has escaped and no time lag will be experienced by the $CO_2$ in getting to and out of outlet 4.

In Figure 2, air is continuously made to escape through air relief device 5 due to the pressure in the piping set up by the advancing carbon dioxide, which is consecutively reaching the respective outlets 4, until it arrives at the last outlet, when substantially all air has been expelled and relief device 5 closes due to thermostatic action to prevent the fire extinguishing medium from being lost therethrough.

From the foregoing description, it will be seen that a high pressure fluid medium distribution system has been provided which will insure improved and speedy distribution of the fluid medium as a result of the elimination of air in the piping otherwise impeding such distribution, and which will at the same time prevent the loss of any medium.

It will be realized quite readily that the present air relief device is presented only in an illustrative sense, and that it may be changed to conform to various applications and may be fitted to various systems without departing from the basic idea underlying the invention. It will therefore be well within the scope of mechanical skill to vary the type of valve means that will react similarly to characteristics of the respective fluid media employed, that is, to obtain combinations similar in result to the one described, not necessarily limited to temperature responsive devices, the number and nature of which would be limited only by their practicability in each case.

Thus, although I have shown and described a specific embodiment of my invention, I am fully aware that many modifications thereof are possible, and it is to be understood that the present invention is not to be limited save as defined in the appended claims.

I claim:

1. In combination, a fire extinguishing apparatus comprising a source of carbon dioxide releasably confined under pressure, a discharge conduit for the carbon dioxide connected to said source, outlet means in said conduit for the carbon dioxide, vent valve means in said conduit, both said last named means normally open with respect to the conduit and to the atmosphere, and means responsive to the effects of expanding carbon dioxide other than those of pressure operatively associated with said vent means to close said valve means.

2. In combination, a fire extinguishing apparatus comprising a source of carbon dioxide releasably confined under pressure, a discharge conduit for the carbon dioxide connected to said source, outlet means in said conduit for the carbon dioxide, vent valve means in said conduit, both said last named means normally open with respect to the conduit and to the atmosphere, and means responsive to the thermal characteristics of expanding carbon dioxide to close said valve means operatively associated therewith.

3. The combination, comprising a source of carbon dioxide releasably confined under pressure, a discharge conduit for the carbon dioxide connected to said source, outlet means in said conduit for the carbon dioxide, valve means normally open in said conduit, and a thermostatic device operatively connected to said valve means to close them when exposed to quickly expanding carbon dioxide.

4. In combination, a fire extinguishing apparatus comprising a source of carbon dioxide releasably confined under pressure, a discharge conduit for the carbon dioxide connected to said source, outlet means in said conduit for the carbon dioxide, valve means normally open in said conduit, and a thermostatic device operatively connected to said valve means to close them upon being exposed to a predetermined temperature.

5. A fire extinguishing system comprising in combination a source of carbon dioxide releasably confined under pressure, a discharge conduit connected to said source, outlet means at the end of the conduit, a plurality of air venting valve means spacially distributed along and connected into the conduit, both said last named means being normally open with respect to the conduit and the atmosphere, and thermostatic means connected to each of said venting valves adapted to close each valve as it is reached by the carbon dioxide advancing toward the outlet means.

6. A fire extinguishing system comprising in combination a source of carbon dioxide releasably confined under pressure, a discharge conduit connected to said source, a plurality of outlet means spacially distributed along and connected into the conduit, air venting means placed at the end of the conduit, both said last named means being normally open with respect to the conduit and the atmosphere, and thermostatic means connected to said venting means adapted to close the venting valve upon being reached by the advancing carbon dioxide.

7. The combination comprising a source of carbon dioxide releasably confined under pressure, a discharge conduit for the carbon dioxide connected to said source, outlet means in said conduit for said carbon dioxide, air vent means in said conduit, and means responsive to said carbon dioxide to close said vent means as soon as it is reached thereby.

AUGUST L. STELLHORN.